United States Patent [19]

Takizawa et al.

[11] Patent Number: 5,249,073
[45] Date of Patent: Sep. 28, 1993

[54] INSTALLATION OF OPTICAL COMPONENTS IN AN OPTICAL DEVICE

[75] Inventors: Yasuo Takizawa, Saitama; Shinyu Ikeda, Tokyo; Masataka Nishiyama, Tokyo; Takaaki Yoshinari, Tokyo; Masakuni Suwashita, Tokyo, all of Japan

[73] Assignee: Asahi Kogaku Kogyo Kabushiki Kaisha, Tokyo, Japan

[21] Appl. No.: 757,222

[22] Filed: Sep. 10, 1991

[30] Foreign Application Priority Data

Sep. 11, 1990 [JP] Japan .............................. 2-95449[U]

[51] Int. Cl.⁵ .................................................. G02B 26/08
[52] U.S. Cl. ................................. 359/206; 359/205; 359/819; 359/900
[58] Field of Search .......................... 359/196–198, 359/205, 206, 209, 210, 212–220, 662, 811, 813, 819, 822, 823, 900; 464/170

[56] References Cited

U.S. PATENT DOCUMENTS

| | | | |
|---|---|---|---|
| 4,527,858 | 7/1985 | Takahashi et al. | 359/206 |
| 4,786,151 | 11/1988 | Hamada | 359/711 |
| 4,796,963 | 1/1989 | Yoshimura | 359/218 |
| 5,124,829 | 6/1992 | Ishikawa | 359/208 |

FOREIGN PATENT DOCUMENTS

| | | | |
|---|---|---|---|
| 0448123 | 9/1991 | European Pat. Off. | 359/218 |
| 132719 | 8/1983 | Japan | 359/206 |
| 137205 | 6/1988 | Japan | 359/206 |

Primary Examiner—Bruce Y. Arnold
Assistant Examiner—James Phan
Attorney, Agent, or Firm—Kane, Dalsimer, Sullivan, Kurucz, Levy, Eisele and Richard

[57] ABSTRACT

A light scanning device having a light source being electrically ON/OFF controlled, deflection member such as a polygon mirror for deflecting light emitted from the light source to perform scanning operation, a first lens for correcting scanning speed of light deflected by the deflection member on a scanning surface, a second lens for correcting astigmatism of the first lens and/or for compensating tilt of the surface of the polygon mirror, a base plate for separately mounting thereon the first and second lenses with predetermined positional relations, and a housing case for mounting thereon the light source, the deflection member and the base plate with predetermined positional relations. The first and second lenses are seated on the base plate in such a fashion that they satisfy the positional relations with other optical components when the base plate is installed on the housing case. The position of the second lens on the base plate is separately adjusted with placing the base plate on an adjusting device so as to prove sufficient optical performance required for light scanning operation.

12 Claims, 4 Drawing Sheets

INSTALLATION OF OPTICAL COMPONENTS IN AN OPTICAL DEVICE

BACKGROUND OF THE INVENTION

The present invention relates to installation of optical components in an optical device, and more particularly to installation of several optical components with predetermined positional relations on the optical device.

In an optical device such as a light scanning device, various optical components must be seated at their positions with a predetermined positional relationship with high accuracy.

Conventionally, each of optical components is independently installed on the device by using appropriate fixing means. In such an installation method, it is inherently required to finish installations of all the optical components with corrections of astigmatism of the seated lenses and so on. It should be noted, however, that fine adjustment of each optical component, after all the optical components are installed, becomes complicated and time-consuming, since there is no sufficient working space for fine adjustment of each optical component.

Especially, in a light scanning device such as a laser beam scanning device employed in a laser printer and so on, a first lens for correcting scanning speed of light deflected by a deflection means on a scanning surface, and a second lens for correcting astigmatism of the first lens which may cause by manufacturing errors of the first lens and/or tilt of the surface of the deflection means, and so on are employed. In order to place the second lens at a position where it completely works to correct the tilt of the surface of the deflection means, the position of the second lens with respect to the first lens must be finely adjusted after other optical components including the first lens are fixed on the scanning device. As explained above, it is troublesome and time-consuming work.

SUMMARY OF THE INVENTION

It is therefore an object of the present invention to provide an improved installation of optical components in an optical device capable of easy but accurate installations.

According to this invention, there is provided a light scanning device comprising:

a light source being electrically ON/OFF controlled;

a deflection means for deflecting light emitted from said light source to perform scanning operation;

a first lens for correcting scanning speed of light deflected by the deflection means on a scanning surface;

a second lens for correcting astigmatism of said first lens and/or tilt of the surface of said deflection means;

a base plate for separately mounting thereon said first and second lenses with predetermined positional relations; and a housing case for mounting thereon said light source, said deflection means and said base plate with predetermined positional relations, wherein said first and second lenses are seated on said base plate in such a fashion that they satisfy the positional relations with other optical components when said base plate is installed on said housing case.

According to another aspect of the invention, provided is a process for assembling a light scanning device which comprises a housing case and optical components to be mounted on said housing case with predetermined positional relations, said optical components including a light source being electrically ON/OFF controlled, a deflection means for deflecting light emitted from said light source to perform scanning operation, a first lens for correcting scanning speed of light deflected by the deflection means on a scanning surface, a second lens for correcting astigmatism of said first lens and/or for compensating tilt of the surface of said deflecting, and other components, said process comprising:

fixing said first lens and seating said second lenses with predetermined positional relations on a separate base plate;

adjusting the position of said second lens on said base plate with placing said base plate on an adjusting device so as to prove sufficient optical performance required for light scanning operation, said adjusting device being constituted by placing at least another light source and another deflection means on a frame plate with positional relations same as required in said light scanning device;

fixing said second lens on said base plate for completing a separate optical unit; and placing and fixing said separate optical unit as well as other optical components on said housing case with predetermined positional relations.

According to further aspect of the invention, there is provided a device for adjusting positional relations of at least one optical component carried on a base plate with respect to other optical components, said base plate and other optical components being installed on an optical device, comprising:

a working plate;

optical components corresponding to said other optical components fixedly arranged on said working plate with positional relations same as required in said optical device; and seating means for seating said base plate at its predetermined position on said working plate, wherein said at-least-one optical component is movably mounted on said base plate; and wherein said at-least-one optical component is moved on said base plate when said base plate is seated on said working plate so as to prove sufficient optical performance required in said optical device, and then fixed.

The above, and other objects, features and advantages of the present invention will become apparent from the following detail description which is to be read in conjunction with the accompany drawings.

DESCRIPTION OF THE ACCOMPANYING DRAWINGS

DESCRIPTION OF THE EMBODIMENTS

Hereinafter, a preferred embodiment of the present invention is explained in detail by referring to accompanying drawings.

Figure 1:
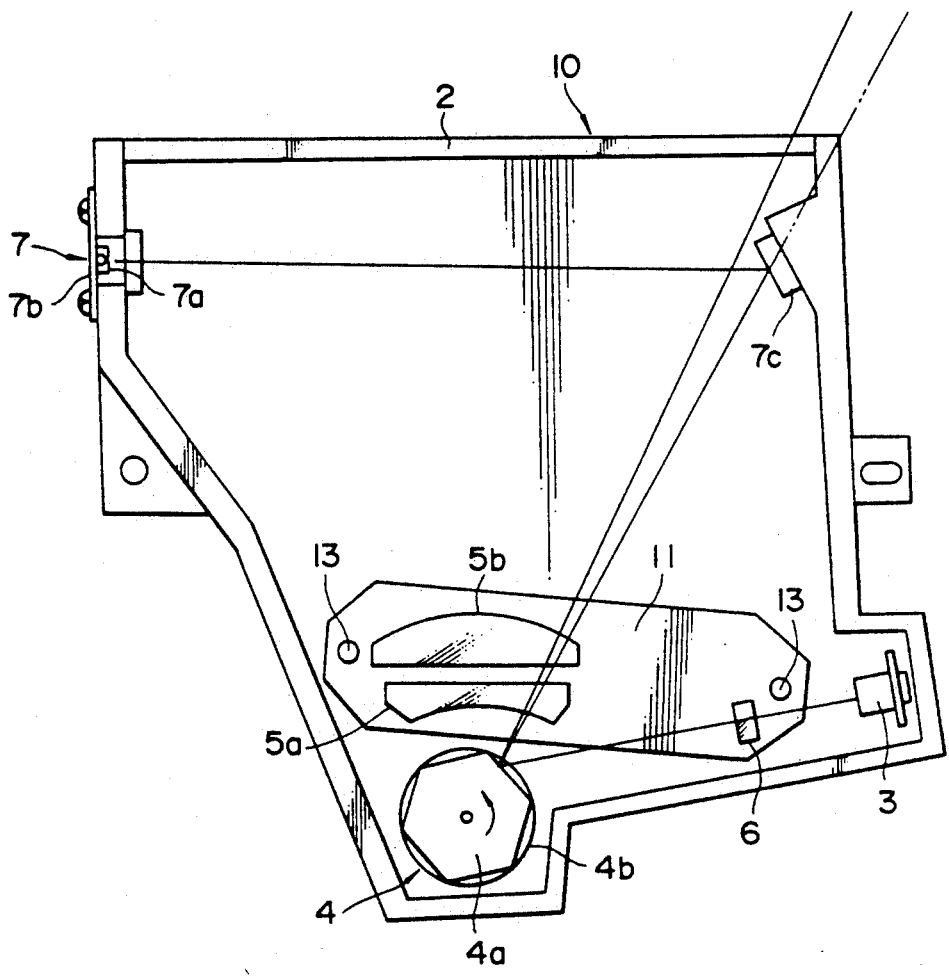
FIG. 1 is a plan view showing principal arrangements of a laser beam scanning device embodying the invention.

FIG. 1 is a plan view showing a laser beam scanning device embodying the present invention, wherein optical components such as a semiconductor laser 3 (light source), a deflection means 4 such as a polygon mirror, an fθ lens having lenses 5a and 5b (first lenses), a cylindrical lens 6 (second lens), and a horizontal-sync signal generating means 7 including a photo-sensor 7a, a signal output member 7b and a reflecting mirror 7c, are mounted on a housing case 2.

The semiconductor laser 3, the deflection means 4, and the horizontal-sync signal generating means 7 are each fixed on the housing case 2 by means of fastener means at predetermined places. On the other hand, the fθ lenses 5a, 5b and the lens 6 are disposed on a base plate 11 as a unit.

Figure 2:
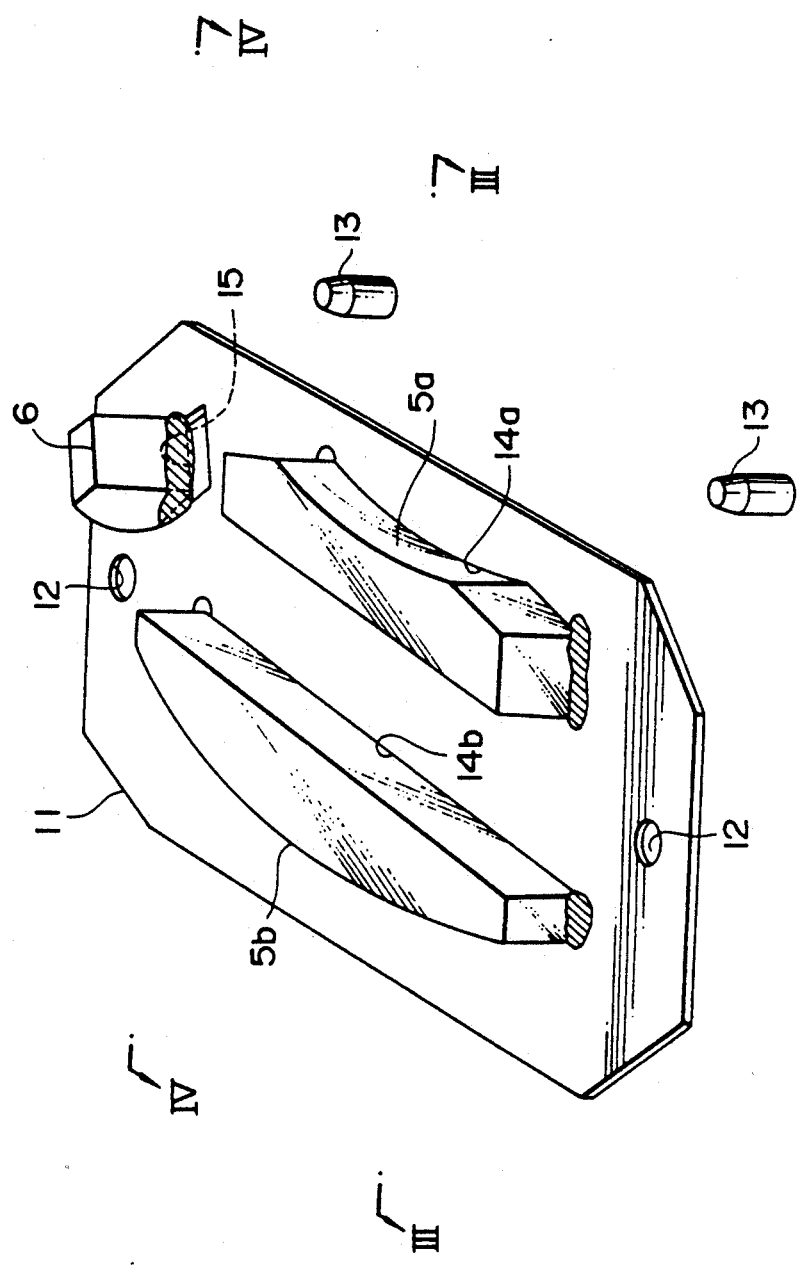
FIG. 2 is a perspective view showing a unit structure of base plate installing lenses.

As shown in FIG. 2, the base plate 11 has a pair of holes 12, 12 which are located to engage with locating pins 13, 13 formed on the housing case 2. The base plate 11 is fixed, after being located through locating pins 13, 13 by means of appropriate bonding means thereon.

Now installation of the fθ lenses 5a, 5b and the lens 6 on the base plate 11 is explained hereinafter.

Figure 3:
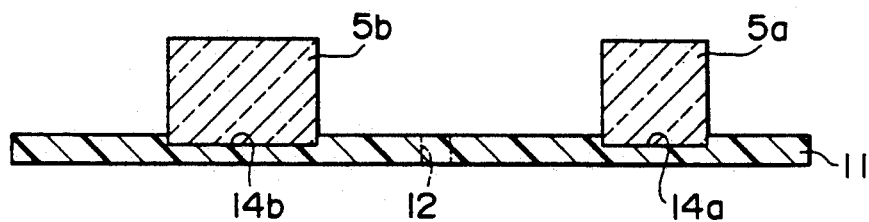
FIG. 3 is a cross-sectional view taken along a line III—III of FIG. 2.

On the base plate 11, there are provided a pair of lens loading portions 14a and 14b, which are formed in concave configuration, as shown in FIG. 3. The position of the lens loading portions 14a and 14b are designed to satisfy predetermined mutual relationship with respect to the semiconductor laser 3 and the deflection means 4 when the base plate 11 is installed. The fθ lenses 5a and 5b are coupled in the concave lens loading portions 14a and 14b, respectively, then they are bonded with the base plate 11 by means of adhesive material.

Figure 4:
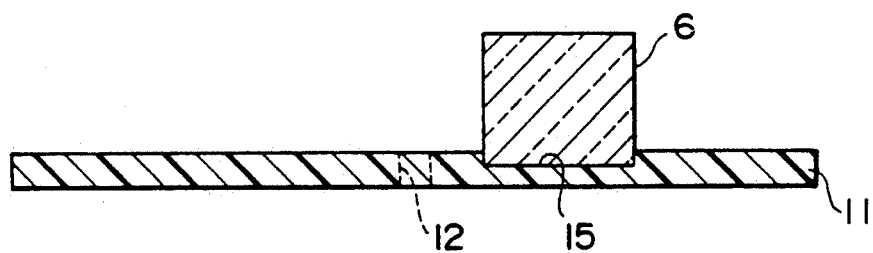
FIG. 4 is a cross-sectional view taken along a line IV—IV of FIG. 2.

Furthermore, there is provided another lens loading portion 15 which is formed in concave configuration and is elongated along the optical axis to be longer than the length of the lens 6 so as to allow the sliding movement of the lens 6 in its elongated direction, as shown in FIGS. 2 and 4. The lens 6 is coupled into the lens loading portion 15.

Figure 5:
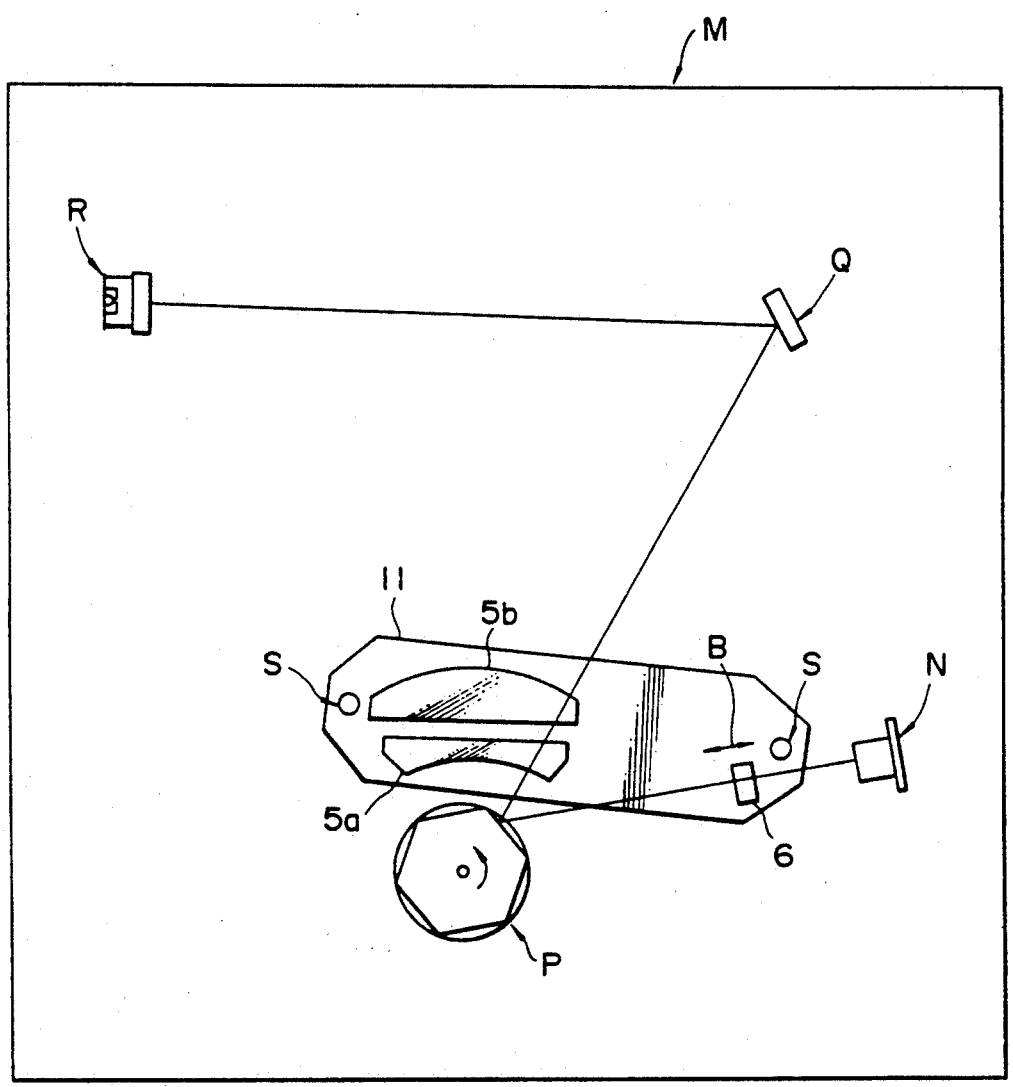
FIG. 5 is a plane view showing an adjusting device for assembling a base plate unit.

An adjusting plate unit M, illustrated in FIG. 5, is utilized to optically adjust the position of the lens 6. The adjusting plate unit M is a flat open plate and is equipped with a light source N, a deflection means P, a reflection mirror Q, a photo-sensor R and location pins S, each of them disposed to satisfy the same mutual relationship as the actual laser beam scanning device illustrated in FIG. 1.

First of all, the base plate 11 carrying the already fixed fθ lenses 5a, 5b and the lens 6 is seated on the unit M by engaging the locating pins S, S with the locating holes 12, 12. Then, the location of the lens 6 is adjusted in a direction of arrow B as shown in FIG. 5. By this adjustment, astigmatism of image-forming beam due to the manufacturing errors of the fθ lenses 5a and 5b and/or tilt of the deflecting means and so on can be compensated. If the position of the lens 6 is finely adjusted enough to prove sufficient optical performance required for beam scanning operation, the lens 6 is then fixed on the base plate 11 by means of appropriate adhesive material.

Thus, the fθ lenses 5a, 5b and the lens 6 are assembled on the base plate 11 out of the housing case 2, and can then be installed on the housing case 2 as an already assembled unit merely by fixing the base plate unit 11 at a predetermined place on the housing case 2. Accordingly, it is not required to conduct installation and positional adjustment works of these optical components 5a, 5b and 6 in the narrow working space remained on the housing case 2, which means working efficiency is greatly improved.

In addition, by employing the base plate 11, it becomes possible to reduce manufacturing cost since the fθ lenses 5a, 5b and the lens 6 can be installed by the adhesive material. Further, compared with fixation by fastener means which may apply deformation force to the optical components, utilizing adhesive material is makes it possible to eliminate this disadvantage.

As this invention may be embodied in several forms without departing from the spirit of essential characteristics thereof, the present embodiment is therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

The present disclosure relates to subject matter contained in Japanese Utility Model Application No. HEI 2-95449 filed on Sep. 11, 1990, which is expressly incorporated herein by reference in its entirety.

What is claimed is:

1. A light scanning device comprising:
    a light source;
    a deflection means for deflecting light emitted from said light source to perform a scanning operation;
    a first lens for correcting a scanning speed of light deflected by the deflection means on a scanning surface;
    a second lens for correcting at least one of an astigmatism of said first lens and for compensating for tilt of a surface of said deflection means;
    a base plate for separately mounting thereon said first and second lenses with predetermined positional relations; and
    a housing case for mounting thereon said light source, said deflection means and said base plate with predetermined positional relations,
    wherein said first and second lenses are seated on said base plate in such a fashion that they satisfy the positional relations with other optical components when said base plate is installed on said housing case.

2. The light scanning device according to claim 1, wherein said base plate is provided with a pair of holes while said housing case has a pair of locating pins; and
    wherein said base plate is positioned on said housing case by engagement of said holes with said locating pins.

3. The light scanning device according to claim 1, wherein said base plate is provided with concave lens loading portions corresponding to said first and second lenses for positioning them; and
    wherein at least one of said loading portions is formed to allow corresponding one of said first and second lenses to slide along its optical axis.

4. The light scanning device according to claim 3, wherein said corresponding one of said first and second lenses is fixed to said at-least-one loading portion by means of an adhesive bonding material.

5. The light scanning device according to claim 1, wherein said light source is a semiconductor laser; and wherein said first and second lenses comprise an fθ lens and a cylindrical lens, respectively.

6. A process for assembling a light scanning device which comprises a housing case and optical components to be mounted on said housing case with predetermined positional relations, said optical components including a light source, a deflection means for deflecting light emitted from said light source to perform a scanning operation, a first lens for correcting a scanning speed of light deflected by the deflection means on a scanning surface, a second lens for correcting at least one of astigmatism of said first lens and tilt of said deflection means, and other components, said process comprising the steps of:

fixing said first lens and seating said second lens with predetermined positional relations on a separate base plate;

adjusting the position of said second lens on said base plate by placing said base plate on an adjusting device so as to provide sufficient optical performance required for light scanning operation, said adjusting device being constituted by a fixed light source and a fixed deflection means on a frame plate with positional relations same as required in said light scanning device;

fixing said second lens on said base plate for completing a separate optical unit; and placing and fixing said separate optical unit as well as other optical components on said housing case with predetermined positional relations.

7. The process according to claim 6, wherein said adjusting step is executed until tilt of said deflection means can be corrected.

8. The process according to claim 6, wherein said base plate is provided with a pair of holes while said housing case has a pair of locating pins; and wherein said base plate is positioned on said housing case by engagement of said holes with said locating pins.

9. The process according to claim 6, wherein said base plate is provided with concave lens loading portions corresponding to said first and second lenses for positioning them; and wherein one of said loading portions corresponding to said second lens is formed to allow said second lens to slide along its optical axis.

10. The process according to claim 9, wherein at least one of said first and second lenses is fixed to the corresponding loading portion by means of adhesive bonding material.

11. The process according to claim 6, wherein said light source is a semiconductor laser; and wherein said first and second lenses comprise an fθ lens and a cylindrical lens, respectively.

12. A light scanning device comprising:

a scanning surface;

a light source;

a deflection means for deflecting light emitted from said light source to perform a scanning operation on said surface;

a first lens positioned between said deflection means and said scanning surface;

a second lens positioned between said light source and said deflecting means;

a base plate for separately mounting thereon said first and second lenses with predetermined positional relations; and a housing case for mounting thereon said light source, said deflection means and said base plate with predetermined positional relations, wherein said first and second lenses are seated on said base plate in such a fashion that they satisfy the positional relations with other optical components when said base plate is installed on said housing case.

* * * * *